Figure 1:
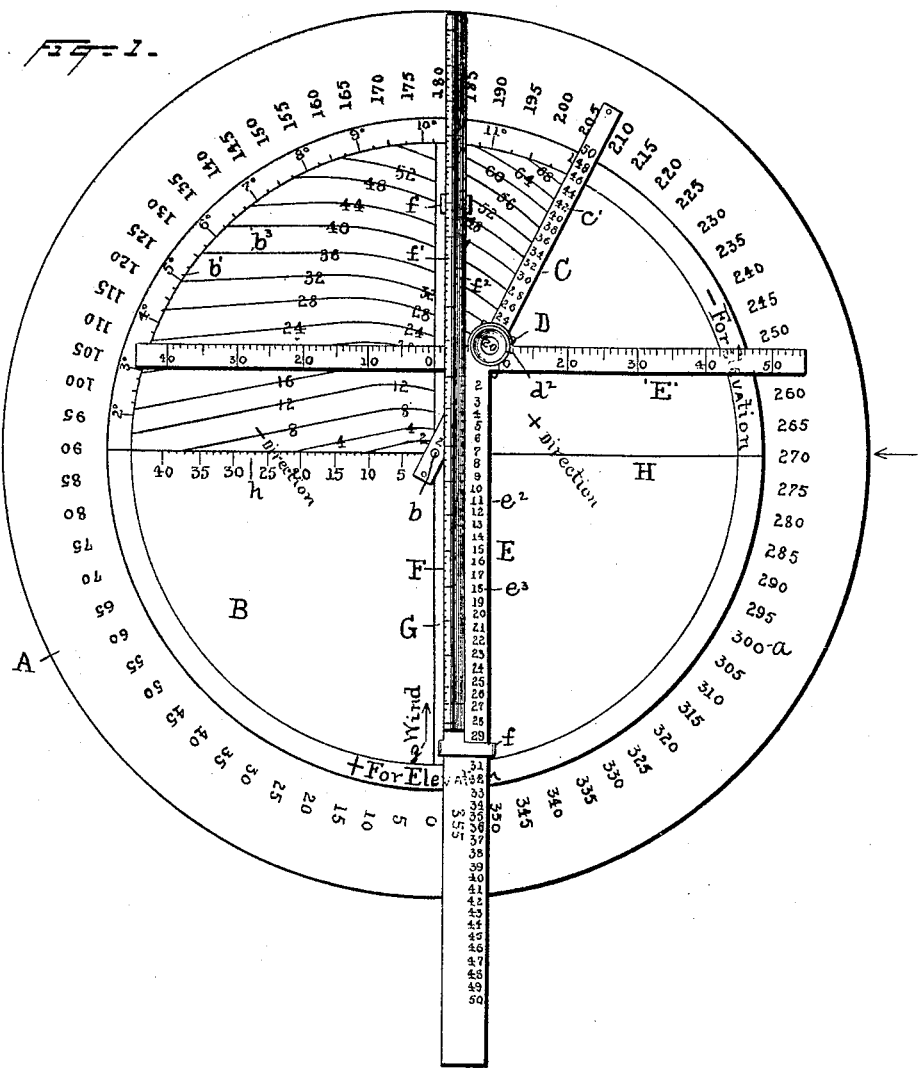

No. 641,467. Patented Jan. 16, 1900.
W. C. RAFFERTY.
DEVICE FOR RESOLVING FORCE INTO ITS RECTANGULAR COMPONENTS.
(Application filed Apr. 13, 1896.)
(No Model.) 2 Sheets—Sheet 1.

Witnesses
Norris A. Clark
John R. Taylor

Inventor
William C. Rafferty
By his Attorneys.
Dyer & Driscoll

THE NORRIS PETERS CO., PHOTO-LITHO., WASHINGTON, D. C.

No. 641,467. Patented Jan. 16, 1900.
W. C. RAFFERTY.
DEVICE FOR RESOLVING FORCE INTO ITS RECTANGULAR COMPONENTS.
(Application filed Apr. 13, 1896.)
(No Model.) 2 Sheets—Sheet 2.
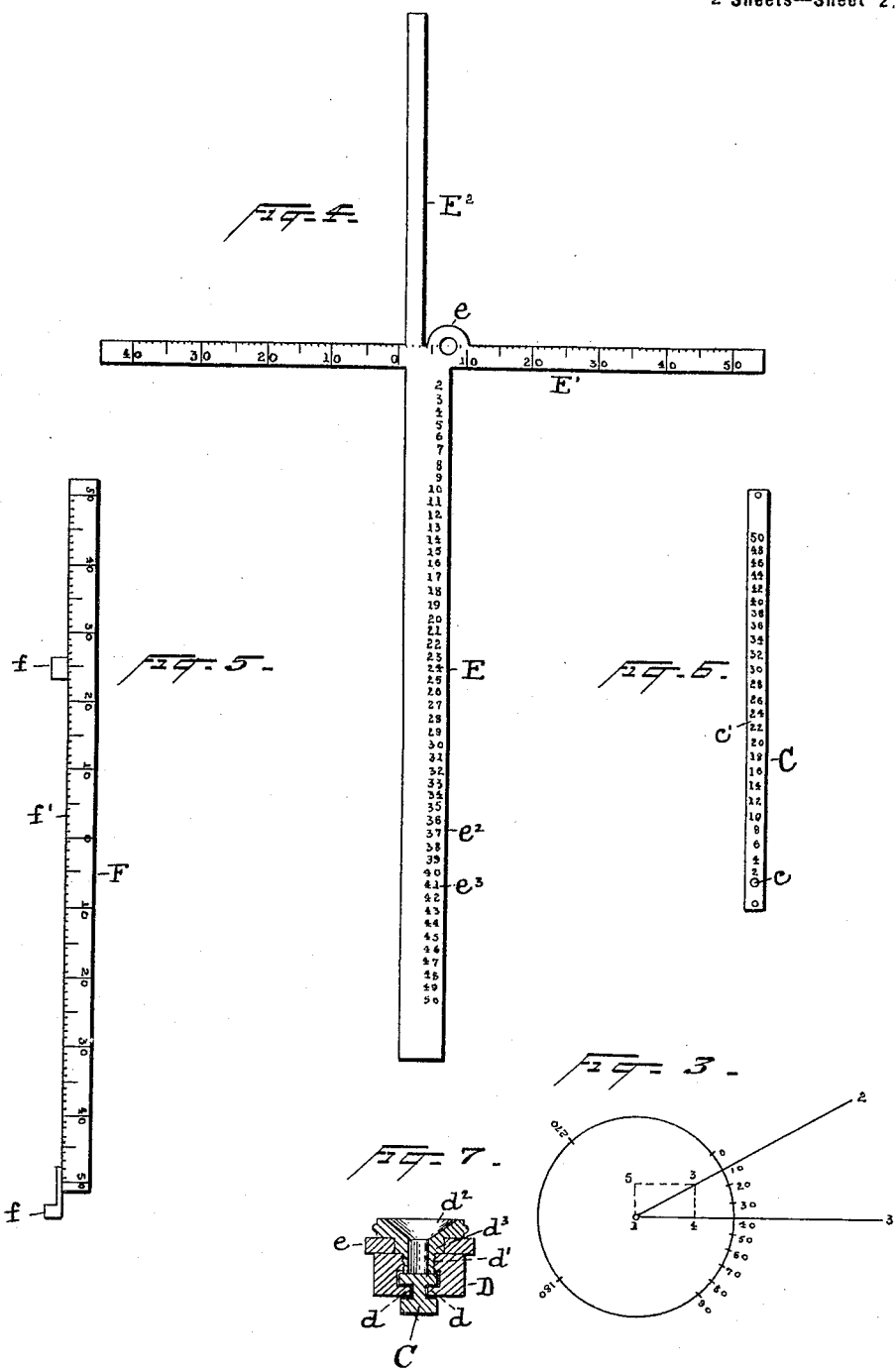

UNITED STATES PATENT OFFICE.

WILLIAM C. RAFFERTY, OF NEW YORK, N. Y.

DEVICE FOR RESOLVING FORCE INTO ITS RECTANGULAR COMPONENTS.

SPECIFICATION forming part of Letters Patent No. 641,467, dated January 16, 1900.

Application filed April 13, 1896. Serial No. 587,315. (No model.)

*To all whom it may concern:*

Be it known that I, WILLIAM C. RAFFERTY, a citizen of the United States, residing at New York, (Governor's Island,) in the State of New York, have invented a certain new and useful Device for Resolving Force into its Rectangular Components, of which the following is a specification.

The object of the present invention is to provide means whereby the rectangular components of a force may be mechanically determined as a basis for calculation of the effect of two or more forces acting conjointly. Thus, as a practical illustration of an application of the invention, if it be desired to hoist a weight up an inclined plane it becomes necessary to calculate, first, the force necessary to move it, and, second, the strength of the inclined plane necessary to sustain such weight. Again, it is desirable for many purposes to determine the effect of the wind upon a structure or object—for instance, in firing a projectile, where the effect of the wind is to cause a deviation of its flight. In both instances referred to I determine by means of the present invention the force applied and its rectangular components, and upon this determination is based, in the first instance, a calculation as to the amount of force necessary to move the weight and the strength of the inclined plane necessary to sustain it, and, in the second instance, the influence in two directions of the wind upon the flight of the projectile, whereby provision may be made for the deviation in flight so caused.

For simplicity of illustration I shall describe the invention herein with reference to its application to the firing of projectiles.

As is well known, the flight of a projectile from a gun is influenced by the wind to a greater or less extent, according to the velocity and direction of the wind—that is to say, if the projectile be fired at an angle to the direction of the wind it will deviate from a straight line in that direction and its range be increased or diminished. Again, if the flight of the projectile be in the direction of the wind it will be influenced in its range by the wind's velocity. When by means of the present invention the influence of the wind under any condition of direction or velocity is determined, provision may be made for both the deviations of flight of the projectile. Again, the flight of a projectile is influenced by the density of the atmosphere, and thus for the purpose of securing greater accuracy in the flight of a projectile it becomes necessary to provide not only for that deviation thereof due to the influence of the wind, but also such deviation as is due to the atmospheric resistance. Again, in practice there is found a deviation of the projectile from a straight line, known as the "drift," and which is occasioned by the rifling of the bore of the gun, and this should also be provided for in firing the projectile. The first of these objects—viz., that of determining the effect of the wind upon the projectile—I provide for by mechanically determining the rectangular components of the wind, and upon that determination is calculated the correction to be given to the elevation of the gun and also to the direction of the gun in view of such deviation. Thus if the projectile be aimed in a direction at an angle to the wind it will be influenced in two directions to an extent determined by the present invention and the corrections to the elevation and to the direction of the gun will compensate for the wind's influence. As to the atmospheric influence upon the projectile, this being the same in all directions has necessarily the same influence upon the projectile regardless of the direction of its flight. The determination of this influence is therefore but a determination of the atmospheric resistance to the flight of the projectile.

Figure 2:
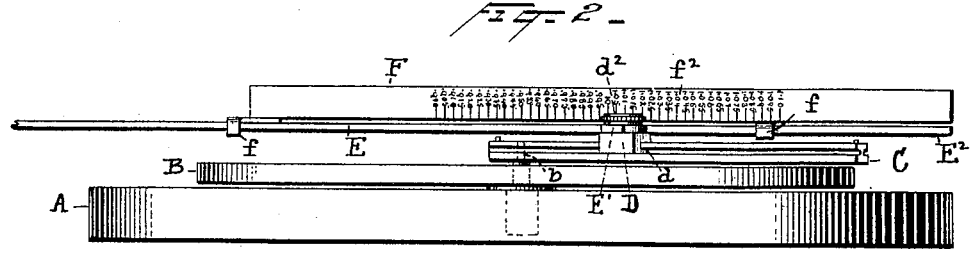

In the drawings, Figure 1 is a plan view of the device. Fig. 2 is a side view looking in the direction of the arrow, Fig. 1. Fig. 3 is a diagrammatic view hereinafter to be referred to. Figs. 4, 5, and 6 are detail plan views, and Fig. 7 a detail sectional view illustrating various parts of the apparatus hereinafter described.

Referring to the drawings, in which similar letters and figures denote corresponding parts, A indicates a base, here shown as circular in form and provided with a circular scale or graduation *a*, indicating the three hundred and sixty degrees of a circle.

B designates a disk mounted upon a pivot *b*, projecting through said disk and secured in the base A. This disk is provided with a mark or other indication G, (hereinafter termed the "wind-mark,") extending from the pivot $b$ and intercepting the periphery of the disk on both sides thereof. It is also provided with a mark or other indication H at right angles to the line G and also extending through the pivot $b$ and on both sides thereof to the periphery. On the disk B are mounted certain indicating apparatus about to be described. Before describing this apparatus attention is called, however, to the diagram illustrated in Fig. 3, to the end that the object of the invention may be first ascertained as an aid to the description of the means employed in attaining such object. In that diagram is shown a circle, the circumference of which is divided to indicate the degrees of a circle, the center of the circle being the point 1. Now to explain the diagram with relation to the application of the invention to the firing of a gun the direction of the wind is first ascertained. In the diagram this is indicated by the line 1 2. The direction of the wind having been found to be ten degrees, the line 1 2 is drawn from the center 1 of the circle through that point at its periphery indicating ten degrees. The direction of the object to be fired upon, and which I shall hereinafter refer to as the "target," is ascertained, and this is represented upon the diagram by the line 1 3. This direction having been found to be forty degrees, the line 1 3 passes from the center point through the forty-degree mark at the periphery of the circle. The angle between these two lines will of course be thirty degrees. Now if we represent graphically the intensity of the force in the direction 1 2 by the length 1 3 the rectangular components with respect thereto will be the lines 1 4 and 1 5, which are respectively equal to the cosine and the sine of thirty degrees multiplied by 1 3. This product of the sine or cosine multiplied by 1 3 is mechanically ascertained by means of this invention.

C designates a radial arm mounted at $c$ upon the pivot $b$ and projecting outwardly beyond the periphery of the disk B. This arm is provided upon its upper surface with the scale or graduation $c'$.

Mounted upon the radial arm C is a sliding block D. In the present instance the sides of the arm C are shown as rabbeted, and the block is provided with projections $d\ d$, engaging with such rabbets. The block D is provided with the central screw-threaded aperture $d'$, with which engages the hollow thumb-nut $d^2$. The aperture $d'$ and that through the nut $d^2$ are of such size as to permit a number of the scale or graduation to be visible through the same.

Mounted upon the block D are the arms E E'. They are here shown as integral and are provided with a perforated ear $e$, a portion $d^3$ of the nut $d^2$ passing through such perforation, and thereby securing the ear (and the arms) to the flange of said nut and the block D. The arm E is provided with a scale or graduation $e^3$, increasing progressively from the pivotal point toward its free end. The arm E' is also provided with a scale or graduation. Both of these scales will be presently described.

Mounted upon the arm E and its extension $E^2$ is a sliding graduated rule F. In the present instance this is triangular in cross-section and provided with clamps $f$, by means of which it is so secured upon the arms E $E^2$ as to slide thereon. This member is provided with two graduations $f'\ f^2$, one upon either side.

The simple operation above referred to of mechanically resolving the rectangular components of the wind for the purpose of determining its influence upon the direction of flight of a projectile will now be described.

It will be understood that the device above described is designed to be located at or adjacent to the gun from which the projectile is to be fired. This gun is mounted in azimuth—that is to say, the muzzle points to the south when the reading is zero. The velocity of the wind is determined by any suitable device—such, for instance, as an anemometer—and its direction by the means commonly employed for that purpose. After having ascertained the direction of the wind the disk B is rotated upon the pivot $b$, so that the wind-mark G will indicate, in the direction of the arrow $g$ adjacent thereto, the direction of the wind, the reading upon the base A adjacent to the end of the line G representing in degrees the direction of the wind. The radial arm C is then moved upon the disk B, so as to indicate the direction from the gun to the target. This direction may be ascertained by means of a range-finder or other suitable instrument. Indeed, the same result may be attained by aiming the gun at the distant object, when, the azimuth of the gun being ascertained, the arm may be so located upon the disk B with respect to the circular scale or graduation $a$ as to give the same reading as the gun. Thus in Fig. 1 the radial arm C has been so placed as to indicate the direction of the target, the same having been found to be two hundred and five degrees. Now, the angle between the arm C and the mark G, indicating the direction of the wind, is the angle the sine and cosine of which it is the object of the apparatus to ascertain. The scale upon the arm C consists of numbers starting at the pivotal point $b$ and increasing as they progress outwardly toward the free end of the arm, such numbers indicating miles of wind. The velocity of the wind having been ascertained by means of the anemometer, the block D, upon which the arms E, E', and $E^2$ are mounted, is moved along said arm until that number representing the velocity of the wind is observable through the aperture in the nut $d'$. The arm E is then moved upon its pivot so that its edge shall be parallel with the wind-line G. The scale upon the transverse arm E' and that upon the left of the scale F are based upon that of the radial arm C, the same units being employed. The zero-point upon this scale is so placed with relation to the center of the ear $e$ as to allow for the drift of the projectile due to the rifling of the bore of the gun. The parts having been brought to the position illustrated in Fig. 1, a reading upon the arm E' where the same is intercepted by the wind-line G will represent, according to the scale employed, the lateral component of the wind, while a reading upon the scale $f'$ of the rule F at the point where it is intercepted by the line H will represent upon the same scale the longitudinal component. From these readings may be determined the longitudinal and lateral effect of the wind upon the projectile.

As is well known, the flight of a projectile is influenced not only by the wind, but by the density of the atmosphere. Therefore, with a scale which will be sufficiently accurate to correct the flight of the projectile, provision must be made for the varying density of the atmosphere. Such provision in the present instance is as follows: The scale $f^2$ upon the right of the scale F is calculated with respect to that $f'$ upon the left thereof, so as to give to the latter an initial reading which shall vary with varying atmospheres—that is to say, should, at the time of the operation, the atmosphere be found by the use of a barometer or other suitable instrument to register 1, the scale F is moved upon the arms E E$^2$ so that the subdivision of the scale upon the left indicating zero shall coincide with the graduated edge of the arm E'.

Turning now to the use of the construction described for the purpose of determining the correction in degrees or parts of a degree or in yards or other measurement of length, it will be seen that the line H is subdivided at $h$, so as to form a scale or graduation which is coincident with that upon the radial arm C. A portion of the periphery of the disk B, in the present instance a little more than a quadrant of the circle, is also subdivided, so as to form a peripheral scale $b'$. The subdivisions of this scale are arbitrarily made and represent by the numbers thereon the elevation to be given to the gun. The correction to be given the gun is one with respect to direction and one with respect to elevation. In determining the correction with respect to elevation I employ a calculation based upon the rectangular components ascertained in the manner heretofore described. The radial arm C is moved upon the disk B to such a position as that it will indicate, according to the scale $b'$, that elevation which, in the absence of deviation due to drift and influence of wind and atmosphere, would carry the projectile direct from the gun to the target. The sliding block D is then moved upon said radial arm so as indicate thereon the longitudinal component obtained as previously ascertained—that is to say, the number indicating, according to the scale employed, such longitudinal component will be observable through the aperture in said block and the hollow nut $d^2$. Suppose, for instance, this longitudinal component has been found to be 32. The block is so placed as that said number is observable through the aperture in the nut $d^2$, and the arm E is then moved with respect to said block so that its right edge $e^2$ will intercept the scale $h$ at the point of location of the same number. The scale $e^3$ consists of numbers representing in minutes yards of range. Therefore that number next adjacent to the edge $e^2$ at the point where such edge intercepts the scale $h$ will indicate the minutes of correction to be applied to the elevation of the gun.

With respect to the correction in the direction of flight of the projectile I employ for this purpose the lines, marks, or other *indicia* $b^3$. These are constructed by points and calculated with regard to the scale $b'$ and, having their purpose and operation in view, may be termed "lines of uniform correction." These lines in the present instance indicate in minutes the correction to be applied. It is obvious, however, that this scale, as well as the other scales above described, may be based upon a measurement of length and represent therefore feet or yards. Again, they may vary in number—that is to say, instead of having a line to indicate each four minutes, as in the present instance, I may employ a line for each minute or for a greater number of minutes. I ascertain the correction in direction while the radial arm is in the position last described—that is to say, directly over that figure upon the peripheral scale $b'$ indicating the elevation of the gun. If prior to this time the lateral component has been found to be, say, 16, the reading upon the scale $b^3$ at that point nearest the mark "16" upon the radial arm C will give this correction of direction.

The correction in elevation and direction is worked out in connection with the reading given at the gun indicating its elevation and the direction in which it is pointed. Under certain conditions the correction is subtracted from this reading, and under other conditions it is added. Thus if the wind be directly in the direction of flight of the projectile the only correction in direction necessary is that allowing for drift of the projectile, and this of course will always be subtracted from the gun-reading. A correction in elevation is essential, however. Otherwise the wind would cause the projectile to pass over and beyond the target. In this instance the correction as above ascertained would be subtracted from the gun-reading. Should the wind be in a direction other than that just supposed, a simple rule will determine whether the correction is to be added to or subtracted from the gun-reading. Should the wind be from any quarter within ninety degrees of the direction in which the gun is pointed, the correction will be added to the elevation of the gun, while if the wind should be from any other quarter the correction would be subtracted. As to the application of the correction in direction should the wind be from any point within one hundred and eighty degrees from the direction of the gun and around to the left, the correction in direction will be subtracted from the gun-reading as to direction, while if the wind were from the direction within the remaining one hundred and eighty degrees on the right the correction would be added. In order that this may be readily done and without making it necessary to determine the operation by calculation, I prefer to provide the surface of the disk B with printed directions, as shown in Fig. 1. Thus when the parts are in the position illustrated in said figure—that is to say, the direction of the wind (zero) is indicated by the wind-line G, and the direction of the target is indicated by the radial arm C standing at "205"—the correction in elevation ascertained in the manner above described will be subtracted from the elevation reading at the gun and the correction in direction will be added to the direction reading at the gun. Having now ascertained the correction to be given, not only to the elevation of the gun, but also the correction made necessary by the influence of the wind, atmosphere, and drift, the gun may be so trained as that the projectile will strike the target with great accuracy.

It will be understood that I propose using one of the devices as above described in connection with each gun or with each battery of guns having approximately the same range. Should it be desirable to employ the device in connection with a gun or battery of guns having greater or less range, this will necessitate a change of the scales $b'$ and $b^3$. This may be readily accomplished by providing sheets covering either the surface of the whole disk or the quadrant thereof, the scale or graduation upon each sheet being so constructed as to permit the use of the same device in connection with guns of different ranges.

It is not essential that the parts be mounted in the exact manner illustrated in the drawings, as I may modify the actual construction and relation so shown without departing from the spirit of the invention. Thus I may find it desirable to countersink the disk B in the base A instead of placing the same upon such base, as illustrated in the drawings. Again, should I find it desirable to employ means for clamping the disk B in any desired relation to the base A or to clamp the arms in any position upon the surface of said disk, this may readily be done. Such means, however, are not herein described or shown, for the reason that they form no essential part of the invention.

What I claim is—

1. A base having an azimuthal scale or graduation, a revoluble disk mounted thereon, and having lines, marks or other indications at right angles to each other upon said disk, and means coacting therewith for determining the rectangular components of a force, substantially as set forth.

2. A base having an azimuthal scale or graduation, a revoluble disk mounted thereon, lines, marks or other indications at right angles to each other carried by said disk, a mark or other indication upon said disk coacting with said scale or graduation to indicate the direction in which a force is applied, and means for mechanically determining, in conjunction with said marks or other indications, the rectangular components of said force.

3. A base having an azimuthal scale or graduation, a revoluble disk mounted thereon and having a mark or other indication coacting with the scale or graduation upon said base to indicate the direction in which a force is applied, a mark or other indication at right angles to the mark or indication first named, and means, acting in conjunction with said base and said disk, for mechanically determining the rectangular components of a force, substantially as set forth.

4. A base having an azimuthal scale or graduation, a revoluble disk mounted thereon, and bearing lines, marks or other indications at right angles to each other and means coacting with said base and disk for determining the effect of deviating influences upon a projectile, substantially as set forth.

5. A base having an azimuthal scale or graduation, a revoluble, graduated disk mounted thereon, means for determining the effect of deviating influences upon the flight of a projectile, and means for determining the correction to be applied to the direction of such flight to compensate for the effect of such deviating influence, substantially as set forth.

6. A base having an azimuthal scale or graduation, a revoluble, graduated disk thereon, means for indicating upon said disk the direction between a gun and a distant object, means for indicating the force tending to influence the flight of a projectile and the direction of application of said force, and means for determining the correction in the training of said gun upon said distant object, to compensate for the deviating influence of said force, substantially as set forth.

7. A base having an azimuthal scale or graduation, a revoluble disk mounted thereon, a peripheral scale or graduation upon said disk, indicating approximately the distance between a gun or battery of guns and a distant object, and means coacting with said base and disk for mechanically determining the correction to be applied to the direction of fire and elevation of said gun or guns, to compensate for the effect of forces tending to influence the flight of a projectile, substantially as set forth.

8. A base having an azimuthal scale or graduation, a revoluble disk, a mark or other indication upon said disk representing, with reference to said azimuthal scale or graduation, the direction in which a force is applied, mechanism for resolving said force into its rectangular components, and means for ascertaining the correction to the application of another force made necessary by the influence of the force first named, substantially as set forth.

9. The combination with a base having an azimuthal scale or graduation, of a revoluble, graduated disk mounted thereon and having a mark or other indication representing the direction in which a force is applied, a pivoted arm having a scale or graduation, and an arm mounted upon said pivoted arm and adjustable thereon, said adjustably-mounted arm having a scale or graduation, substantially as set forth.

10. The combination with a base having an azimuthal scale or graduation, of a revoluble disk mounted thereon and having a mark or other indication representing the direction in which a force is applied, a pivoted arm, and two arms adjustably mounted upon said pivoted arm, said disk and pivoted arm and the two arms mounted upon said pivoted arm having scales or graduations, substantially as set forth.

11. The combination with a base having an azimuthal scale or graduation, of a revoluble, graduated disk mounted thereon and having a mark or other indication representing the direction in which a force is applied, a pivoted arm, and two arms located at right angles to each other and adjustably mounted upon said pivoted arm, substantially as set forth.

12. The combination with a base having an azimuthal scale or graduation, of a revoluble, graduated disk mounted thereon and having a mark or other indication representing the direction in which a force is applied, a pivoted arm, and two arms located at right angles to each other and adjustably mounted upon said pivoted arm, said two arms having scales or graduations, substantially as set forth.

13. The combination with a base having an azimuthal scale or graduation, of a revoluble disk mounted thereon and having a scale or graduation and a mark or other indication representing the direction in which a force is applied, a pivoted arm, a sliding block upon said pivoted arm, and two arms located at right angles to each other and pivotally mounted upon said sliding block, substantially as set forth.

14. The combination with a base having an azimuthal scale or graduation, of a revoluble disk mounted thereon and having a scale or graduation and a mark or other indication representing the direction in which a force is applied, a pivoted arm, a sliding block upon said pivoted arm, two arms located at right angles to each other and pivotally mounted upon said sliding block, and means for clamping said block in position upon said pivoted arm, substantially as set forth.

15. The combination with a base having an azimuthal scale or graduation, of a revoluble disk mounted thereon and having a scale or graduation and a mark or other indication representing the direction in which a force is applied, a pivoted arm, two arms located at right angles to each other and adjustably mounted upon said pivoted arm, and a graduated rule adjustably mounted upon one of said two arms, substantially as set forth.

16. The combination with a base having an azimuthal scale or graduation, of a revoluble disk mounted thereon and having a scale or graduation and a mark or other indication representing the direction in which a force is applied, a pivoted arm, two arms located at right angles to each other and adjustably mounted upon said pivoted arm, and a graduated rule mounted upon one of said two arms and having longitudinal movement thereon, substantially as set forth.

This specification signed and witnessed this 7th day of March, 1896.

WILLIAM C. RAFFERTY.

Witnesses:
S. O. EDMONDS,
JOHN R. TAYLOR.